United States Patent
Chen et al.

(10) Patent No.: US 9,295,064 B2
(45) Date of Patent: *Mar. 22, 2016

(54) METHODS, SYSTEMS AND APPARATUS TO FACILITATE RANKED NETWORK PRIORITY

(71) Applicants: AT&T Intellectual Property I, L.P., Atlanta, GA (US); Purdue Research Foundation, West Lafayette, IN (US)

(72) Inventors: Yih-Farn Chen, Bridgewater, NJ (US); Rittwik Jana, Parsippany, NJ (US); Karthik Kannan, West Lafayette, IN (US)

(73) Assignees: Purdue Research Foundation, West LaFayette, IN (US); AT&T Intellectual Property I., L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,165

(22) Filed: Jun. 2, 2014

(65) Prior Publication Data

US 2014/0274097 A1    Sep. 18, 2014

Related U.S. Application Data

(63) Continuation of application No. 13/252,467, filed on Oct. 4, 2011, now Pat. No. 8,761,787.

(51) Int. Cl.
| | |
|---|---|
| *H04W 72/00* | (2009.01) |
| *H04W 72/06* | (2009.01) |
| *H04W 72/10* | (2009.01) |
| *H04W 72/12* | (2009.01) |

(52) U.S. Cl.
CPC ............. *H04W 72/06* (2013.01); *H04W 72/10* (2013.01); *H04W 72/1247* (2013.01)

(58) Field of Classification Search
CPC ...... H04W 72/06; H04W 72/10; H04W 72/12
USPC .............................. 455/452.1–452.2; 709/226
See application file for complete search history.

(56) References Cited

U.S. PATENT DOCUMENTS

| | | | | |
|---|---|---|---|---|
| 6,125,278 | A * | 9/2000 | Wieczorek et al. | 455/437 |
| 7,634,430 | B2 | 12/2009 | Huberman et al. | |
| 7,752,017 | B1 * | 7/2010 | Leary et al. | 703/2 |
| 7,849,133 | B2 | 12/2010 | Denker et al. | |
| 7,865,598 | B2 | 1/2011 | Denker et al. | |

(Continued)

OTHER PUBLICATIONS

Sun et al., "Wireless Channel Allocation Using an Auction Algorithm," IEEE Journal on Selected Areas in Communication, vol. 24, No. 5, May 2006 (12 pages).

(Continued)

*Primary Examiner* — Nathan Taylor
(74) *Attorney, Agent, or Firm* — Hanley, Flight & Zimmerman, LLC

(57) ABSTRACT

Methods, systems and apparatus are disclosed to facilitate ranked network priority. An example method includes calculating a rank of a first wireless device relative to a plurality of wireless devices based on a first bid value associated with the first wireless device, allocating a first bit rate to the first wireless device based on the rank of the first wireless device at a first time, and in response to detecting a change in availability of the first bit rate at a second time, applying a second bid value for a second bit rate when the first wireless device is located in a first geographic area, and applying a third bid value for the second bit rate when the first wireless device is located in a second geographic area different from the first geographic area.

20 Claims, 9 Drawing Sheets

(56) References Cited

U.S. PATENT DOCUMENTS

| | | | |
|---|---|---|---|
| 7,979,504 | B2 | 7/2011 | Denker et al. |
| 7,996,536 | B2 | 8/2011 | Denker et al. |
| 2003/0083926 | A1 | 5/2003 | Semret et al. |
| 2003/0101124 | A1* | 5/2003 | Semret et al. ............ 705/37 |
| 2003/0154112 | A1* | 8/2003 | Neiman et al. ............ 705/5 |
| 2004/0010592 | A1* | 1/2004 | Carver et al. ............ 709/226 |
| 2004/0111308 | A1 | 6/2004 | Yakov |
| 2004/0199635 | A1* | 10/2004 | Ta et al. ............ 709/226 |
| 2004/0248583 | A1* | 12/2004 | Satt et al. ............ 455/452.2 |
| 2006/0122927 | A1* | 6/2006 | Huberman et al. ............ 705/37 |
| 2009/0164635 | A1* | 6/2009 | Denker et al. ............ 709/226 |
| 2009/0171821 | A1* | 7/2009 | Denker et al. ............ 705/30 |
| 2009/0177776 | A1* | 7/2009 | Denker et al. ............ 709/226 |
| 2009/0219876 | A1* | 9/2009 | Kimura et al. ............ 370/329 |
| 2011/0060834 | A1* | 3/2011 | Denker et al. ............ 709/226 |
| 2011/0072139 | A1* | 3/2011 | Denker et al. ............ 709/226 |
| 2013/0084878 | A1 | 4/2013 | Chen et al. |

OTHER PUBLICATIONS

Schwartz, Michael, "Internet Advertising and the Generalized Second Price Auction," video retrieved from <http://video.google.com/videoplay?docid=126302100433476950>, Feb. 9, 2006 (1 page).

Mackie-Mason et al, "Pricing Congestible Network Resouces," IEEE Journal on Selected Areas of Communications, vol. 13, No. 7, Sep. 1995 (9 pages).

"TUBE: Overview," The Princeton EDGE Lab 2011, retrieved from <http://scenic.princeton.edu/tube/overview.html>, retrieved on Sep. 26, 2011 (3 pages).

"TUBE: Technology," The Princeton EDGE Lab 2011, retrieved from <http://scenic.princeton.edu/tube/technology.html>, retrieved on Sep. 26, 2011 (2 pages).

"TUBE: Survey," The Princeton EDGE Lab 2011, retrieved from <http://scenic.princeton.edu/tube/survey.html>, retrieved on Sep. 26, 2011 (8 pages).

United States Patent and Trademark Office, "Non-Final Office Action," issued in connection with U.S. Appl. No. 13/252,467, mailed Oct. 3, 2012 (16 pages).

United States Patent and Trademark Office, "Final Rejection," issued in connection with U.S. Appl. No. 13/252,467, mailed Mar. 12, 2013 (22 pages).

United States Patent and Trademark Office, "Notice of Allowance," issued in connection with U.S. Appl. No. 13/252,467, mailed Feb. 10, 2014 (9 pages).

* cited by examiner

METHODS, SYSTEMS AND APPARATUS TO FACILITATE RANKED NETWORK PRIORITY

RELATED APPLICATIONS

This patent arises from a continuation of U.S. patent application Ser. No. 13/252,467, entitled "METHODS, SYSTEMS AND APPARATUS TO FACILITATE RANKED NETWORK PRIORITY," which is hereby incorporated herein by reference in its entirety.

FIELD OF THE DISCLOSURE

This disclosure relates generally to network services, and, more particularly, to methods, systems and apparatus to facilitate ranked network priority.

BACKGROUND

In recent years, wireless service providers and/or, more generally, network providers have experienced a dramatic increase in wireless smart phone sales and a corresponding demand for abundant and fast data services. In some locations, the volume of mobile data traffic in 2014 is projected to be forty (40) times that of mobile data traffic consumption in 2009. Such demand causes and/or will likely cause a strain on the service providers to satisfy subscriber expectations.

Network providers employ a four-pronged approach to meet subscriber demand or curtail subscriber usage of their network(s). A first approach employed by the network providers includes improving network capabilities by installing additional network resources, such as additional cell towers for examples relating to wireless services. A second approach employed by the network providers includes offloading data servicing to WiFi hotspots, which may not be under the ownership and/or control of the network provider. A third approach includes limiting authorized use of relatively high-bandwidth mobile applications (apps) on some smart phones unless connected to a WiFi network. Such an approach is not well received by some subscribers. A fourth approach attempts to shape and/or otherwise curtail subscriber usage behavior through one or more economic incentives, such as eliminating unlimited data pricing plans. In some examples, network providers have implemented a tiered pricing scheme, in which subscribers are limited to a predetermined amount of data per time period (e.g., 100 megabytes per month).

DETAILED DESCRIPTION

Figure 1:
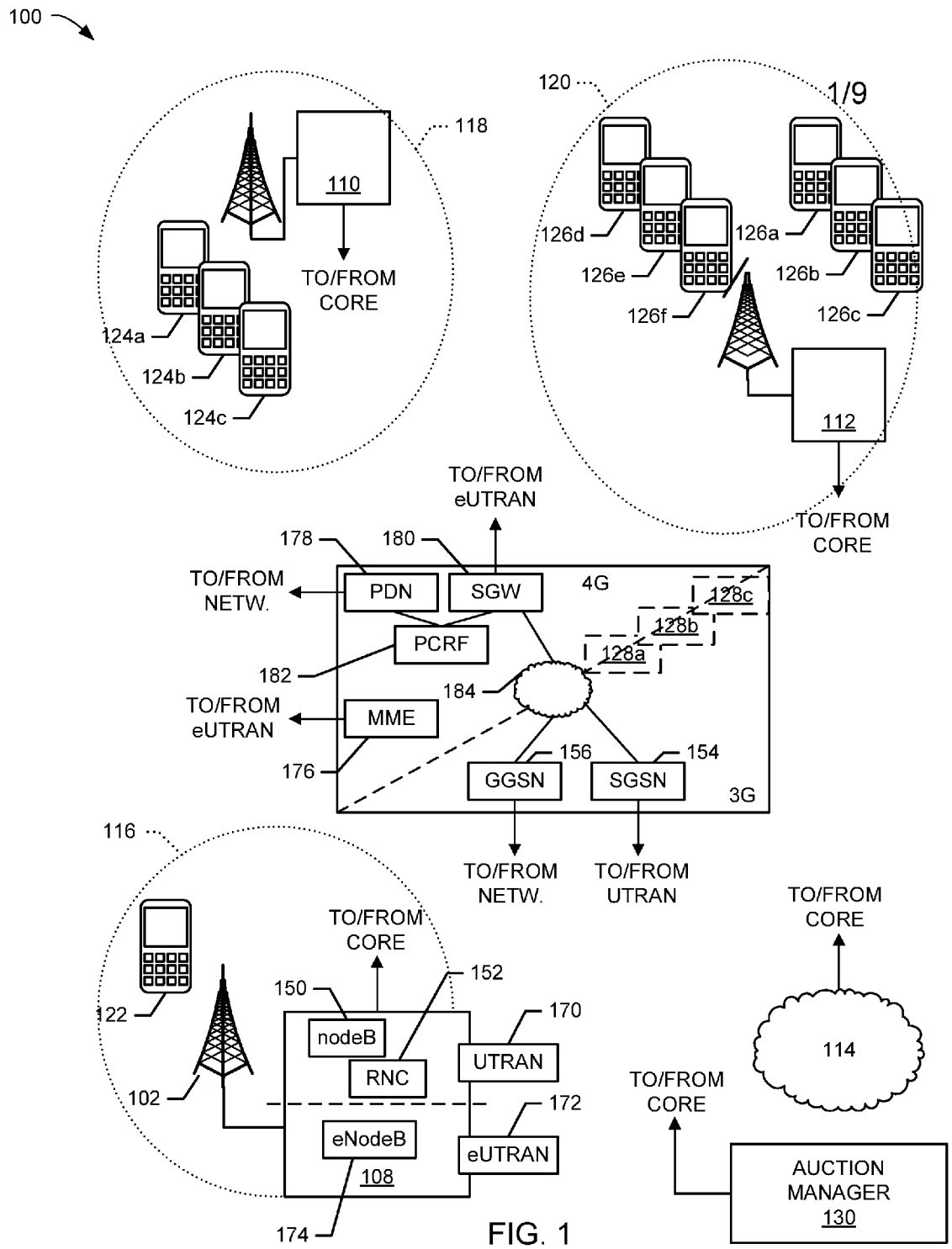
FIG. 1 is a schematic illustration of an example wireless network environment controlled in accordance with the teachings of this disclosure to facilitate ranked network priority services.

Methods, systems, apparatus, and articles of manufacture are disclosed, which include obtaining a candidate bid value associated with a first wireless device, calculating a rank of the first wireless device with a plurality of wireless devices based on (a) the candidate bid value, (b) an operating characteristic of the first wireless device, and (c) a scheduling model, and allocating a first portion of wireless network resources to the first wireless device based on the rank of the first wireless device.

Although network providers, such as wireless service providers, Internet service providers (ISPs), and/or other providers of subscriber-based services, apply one or more techniques to curtail customer data usage behavior(s), such techniques affect an aggregate amount of data consumed over relatively long periods of time. Congestion, on the other hand, is a consequence of limited bandwidth (e.g., speed of delivery) availability that affects a user experience in a relatively short period of time. For example, a network that currently has a relatively small number of users (i.e., currently has a low level of congestion), such as wireless subscribers that currently share a common cell tower, is able to provide data services without significant delay. As a result, user actions on their associated wireless devices respond relatively quickly to one or more requests to send and/or receive data. For instance, users that browse web pages on their wireless device (e.g., smart phone) experience responses in a manner similar to a desktop web-browsing experience when the shared cell tower currently services a relatively small number of wireless devices (e.g., currently have a low congestion level). In other words, cell towers that are not burdened with a large number of wireless devices may provide faster responses and/or faster data throughput than cell towers that are overburdened with users.

As a number of users serviced by the cell tower increases (high congestion level), each wireless device competes with other wireless devices of that cell tower for a limited amount of shared resources that the cell tower can accommodate.

Some wireless network technologies manage one or more aspects of subscriber bandwidth by allocating a number of codes, such as channelization codes in High Speed Downlink Packet Access (HSDPA) or 3G. To increase throughput for a particular user/subscriber/wireless device, an allocated number of channelization codes may be increased for that user/subscriber/wireless device. In some examples, throughput for a particular user/subscriber/wireless device is controlled by a core network, a gateway and/or a server.

While network providers may employ one or more tiered data plans, in which subscribers pay a fee for a monthly quantity of data (e.g., 5 Gb of data per 30-day period), such services are related to a volume of delivery and do not affect the subscriber's speed of delivery (e.g., a rate of data access/bandwidth). In effect, a premium subscriber (e.g., a subscriber paying a fee in a costlier tier) will experience the same bandwidth benefits and/or limitations as a non-premium subscriber (e.g., a subscriber paying a fee in a less expensive tier) at a particular cell tower because the cell tower allocates bandwidth resources to users independent of one or more subscription plans.

Methods, apparatus, systems and/or articles of manufacture disclosed herein allow network providers and/or service providers to manage bandwidth congestion. In some examples, methods, apparatus, systems and/or articles of manufacture disclosed herein, wireless service providers establish a valuation metric for data services based on a metric associated with congestion of the network, such as congestion metrics associated with one or more wireless service nodes, systems, networks and/or cell towers of a wireless network (e.g., a wireless telephone network). Valuation metrics may include, but are not limited to a base price to use one or more wireless services, and/or a price based on users competing for wireless resources. Additionally, subscribers of the network provider may provide one or more bids to adjust a level of bandwidth performance associated with a wireless device. In some examples, network element(s) (e.g., nodeB device, eNodeB device, radio network controller, serving general packet radio service (GPRS) support node (SGSN), universal terrestrial radio access network (UTRAN), evolved UTRAN (eUTRAN), radio network controller (RNC), etc.) may accept a subscriber bid having more than a threshold value. When such a bid is accepted, the network element(s) allocate additional network resources and/or permit increased data bandwidth throughput for the winning subscriber, thereby providing improved data bandwidth performance to the wireless device of the winning subscriber. As described in further detail below, one or more example bidding techniques employ a Generalized Second Price (GSP) auction technique to discover prices acceptable to subscribers for one or more bandwidth services (e.g., premium services, average services, budget services, etc.), thereby relieving and/or even minimizing congestion effects for those subscribers willing to pay a higher price for a corresponding higher network priority.

In the illustrated example of FIG. 1, an example wireless network environment 100 includes a first cellular (cell) tower 102, a second cell tower 104 and a third cell tower 106. Each of the first, second and third cell towers 102, 104, 106 is communicatively connected to a first tower interface 108, a second tower interface 110 and a third tower interface 112, respectively. Generally speaking, the first, second and third tower interface 108, 110, 112 facilitate communication between one or more wireless devices and a core network 113 associated with a wireless service provider. The example tower interfaces 108, 110, 112 may include, but are not limited to 2G wireless technologies, 3G wireless technologies, 4G wireless technologies and/or combinations thereof. Example 3G wireless technologies may be employed by a UTRAN tower interface, such as the example UTRAN 170 shown in FIG. 1. The example UTRAN 175 tower interface 108 of FIG. 1 includes a nodeB 150 and a radio network controller 152. In other examples, the example tower interface 108 may include an eUTRAN 172 that includes an eNodeB 174. While the example tower interface 108 of FIG. 1 illustrates UTRAN 170 and eUTRAN 172 configurations, such configurations may be employed with example tower interface 110 and/or example tower interface 112, without limitation. The example core network 113 may be communicatively connected to a network 114, such as a wireless service provider network, one or more intranets and/or the Internet. Connection may include one or more firewalls (not shown). The example core network 113 may include any number of network elements including those related to any type of wireless technology such as, for example, 2G, 3G, 4G, LTE, etc. The example core network 113 of FIG. 1 may include 3G network component(s) including, but not limited to, a gateway general packet radio service support node (GGSN) 156, and/or a serving general packet radio service support nodes (SGSNs) 154. In other examples, the core network 113 may include 4G wireless network technologies and corresponding elements including, but not limited to, a mobility management entity (MME) 176, a packet data network (PDN) gateway 178, a serving gateway (SGW) 180 and/or a policy charging and rules function (PCRF) 182. In some examples, one or more of the first, second and/or tower interfaces 108, 110, 112 communicatively connect to the example network 114 prior to connecting with the example core network 113. The example core network 113 of FIG. 1 may include one or more additional and/or alternate network elements including, but not limited to, an internal backbone network 184, multi-service proxies, intermediate network elements, and/or routers. Each of the first, second and/or third cell towers 102, 104, 106 facilitates wireless communication services for a finite geographic region within which the cell towers 102, 104, 106 and associated radio(s) therein may establish a first, second and/or third data communication cell area 116, 118, 120, respectively.

The example first, second and/or third data communication cell areas 116, 118, 120 of FIG. 1 may include any number of wireless devices that, when communicating with a cell tower, share communication resources of the cell tower and its associated tower interface. In the illustrated example of FIG. 1, the first data communication cell area 116 includes one wireless device 122, the second data communication cell area 118 includes three (3) wireless devices 124a-c, and the third data communication cell area 120 includes six (6) wireless devices 126a-f. Generally speaking, a tower interface and its associated cell tower may accommodate far greater numbers of wireless devices than shown in the illustrated example of FIG. 1. However, for purposes of explanation, and not limitation, a quantity of six (6) wireless devices in the example third data communication cell area 120 is deemed to overload and/or otherwise stress the example third cell tower 106 and the associated third tower interface 112. As used herein, an overloaded cell tower results in one or more connected wireless devices experiencing low bandwidth due to competition from other wireless devices sharing the combined communication resources of the cell tower and its associated tower interface. On the other hand, for purposes of explanation, and not limitation, a quantity of one wireless device in the example first data communication cell area 116, and a quantity of three (3) wireless devices in the example second data communication cell area 118 are deemed to allow satisfactory bandwidth rate(s) for all users.

The example first, second and third tower interfaces 108, 110, 112 may represent any type of network technology including, but not limited to GSM/GPRS networks, Code Division Multiple Access (CDMA) networks, third-generation (3G) networks (e.g., EDGE, UMTS, etc.), fourth-generation (4G) networks, Personal Communication Systems (PCS) networks, Time Division Multiple Access (TDMA) networks and/or 3GPP Long Term Evolution (LTE) networks. In the illustrated example of FIG. 1, the wireless network environment 100 includes High Speed Downlink Packet Access (HSDPA) technology that employs packet schedulers in a tower interface, sometimes referred to herein as a nodeB. HSDPA nodeB schedules wireless channels to users at 2 millisecond intervals to provide data rates between 2 Mbps and 10 Mbps. However, one or more alternate wireless network technologies may be employed and/or may facilitate faster or slower data rates.

Continuing with the aforementioned HSDPA example, data throughput for any particular user/subscriber may be increased via code allocation and/or bandwidth throttling by one or more network elements, such as the example nodeBs 150 and/or the example GGSN 156. The packet scheduler of the example nodeB (e.g., the first, second, and/or third tower interface 108, 110, 112) and/or GGSN 156 allocates resources to one or more users/subscribers (e.g., wireless device(s) in a particular geographic area served by or corresponding tower interface and/or associated cell tower) in a manner that promotes fairness (e.g., equal network access) among the individual users while attempting to maintain high overall throughput for all users. Example scheduling policies employed by network devices (e.g., nodeBs 150, GGSNs 156, eNodeBs 174, etc.) include round robin (RR) policies, max throughput (MT) policies and proportional fair (PF) policies. The example RR policy causes the network element(s) to prioritize all user devices (e.g., wireless telephones) equally, regardless of a channel quality associated with that wireless device. For example, devices that are relatively far away from a cell tower are afforded the same priority as devices that are relatively close to the cell tower. Generally speaking, the RR policy sacrifices data throughput while promoting fairness for each of the devices within communication range of the cell tower and its associated network element(s) (e.g., nodeBs 150, eNodeBs 174, RNCs 152, etc.).

The example MT policy causes the network element(s) to prioritize resource allocation based on a maximum throughput (e.g., bit rate). As a result, the example MT policy results in a disadvantage for devices near an edge of a cell tower boundary because, in part, channel qualities associated with the device are typically inferior when compared to channel qualities associated with devices that are physically closer to the cell tower. Additionally, the example MT policy provides a relatively good throughput at the expense of fairness to those devices having inferior channel qualities due to distance and/or interference (e.g., building materials).

The example PF policy causes the network element(s) to prioritize resource allocation based on a ratio of device instantaneous throughput of data and device average throughput of data. In effect, the example PF policy weighs the current achievable bit rate by the average rate received by that device. The average rate may be calculated over any time period as, for example, a moving average. Additionally, the example PF policy provides a balance between maximizing system throughput and fairness.

Example methods, apparatus, systems and/or articles of manufacture disclosed herein modify network element polic(ies) (e.g., at the nodeB, at the eNodeB, at the GGSN, etc.) by considering, in part, bids submitted by users/subscribers having connectivity to a cell tower when determining how to allocate bandwidth among user devices. Additionally or alternatively, example methods, apparatus, systems and/or articles of manufacture disclosed herein modify data rates allocated to one or more wireless devices associated with the users/subscribers based on the accepted bids. Allocation of network element (e.g., nodeB) channel resources can be considered as occurring sequentially (e.g., a sequence of 2 ms frames in 3G networks). However, service providers typically have no prior knowledge of an amount of money users are willing to pay for privileged access to the network element channel resources and/or a data rate. Additionally, while bidding facilitates an ability to identify a value for data rate resources, expecting a user to submit a bid for each instance of a data frame privilege (e.g., a channel resource) every 2 ms is impractical. As such, example methods, apparatus, systems and/or articles of manufacture disclosed herein treat the wireless sequential frame frequency and/or frame allocation as a multi-unit differentiated product (MUDP) that involve resource allocation decisions across a number of rounds that are larger than their lowest (most granular) resolution (e.g., 2 ms). For example, an auction of MUDP resources may establish a single bid to be applied on behalf of the user for any number of 3G frame sequences, with one or more options to change the bid price when desired. In other examples, data rate control and/or allocation may be realized by way of data throttling via core network element control. For example, data rate control may be guided by policy enforcement related to a corresponding communication area (e.g., 116, 118, 120), based on bid values, based on wireless device technology types (e.g., 2G devices, 3G devices, 4G devices, LTE devices, etc.) and/or capabilities of the wireless devices. In some examples, if the wireless device lacks a capability to process and/or otherwise handle a particular data rate, one or more services may be throttled and/or otherwise tailored when provided to that wireless device.

The MUDP resource auction of the illustrated example is facilitated via, for example, a Generalized Second Price (GSP) auction-based mechanism to discover acceptable prices from the network users for one or more available services and/or network privileges. In part, the GSP auction allows the highest bidder to pay an amount equal to the bid submitted by a next highest bidder. In the illustrated example, the actual price charged to the user never exceeds the maximum price specified in the bid. The prices for privileged network access are revealed by consumer data (actual consumer bids as opposed to marketing guesswork) in the example of FIG. 1 network providers can offer a differentiated bandwidth service in real-time between the cell tower and each user device connected thereto. Employing GSP auctions also allows for managing geographic congestion disparity, such as the effects of congestion that change when a user travels from a rural area to an urban area. For example, prices based on congestion issues are likely different in less populated areas (e.g., West Lafayette, Ind.) than they are in more populated areas (e.g., Manhattan, N.Y.). For example, population densities near cell towers in Manhattan are typically substantially greater than population densities in West Lafayette, thereby resulting in congestion issues in Manhattan that are rare or non-existent in West Lafayette.

In the illustrated example of FIG. 1, a first core resource manager 128a, a second core resource manager 128b and a third core resource manager 128c of the core network 113 are communicatively connected to and/or otherwise associated with the first tower interface 108, the second tower interface 110 and the third tower interface 112, respectively. In operation, the example core resource managers 128a-c measure an indication of bandwidth activity rate (e.g., congestion) associated with a communication cell area (e.g., the first communication cell area 116, the second communication cell area 118, or the third communication cell area 120) and/or measure an indication of bandwidth activity rate associated with one or more elements of the core 113, and publish the same to one or more wireless devices within range of a corresponding tower interface 108, 110, 112. For example, the core resource manager 128a associated with the first data communication cell area 116 only includes a small number of wireless devices 122 and, as a result, does not measure an activity indicative of heavy congestion. On the other hand, the core resource manager 128c associated with the third data communication cell area 120 includes many wireless devices 126a-f and, as a result, measures an activity rate indicative of heavier congestion as compared to the first data communication cell area 116. The example indication of congestion may include a value in megabits per second (Mb/s) and one or more degrees of congestion may be identified in view of threshold values with which to compare the measured bandwidth and/or data rate. In some examples, a measured data rate is published to subscribers/users within range of the cell tower. If the measured data rate exceeds one or more threshold values, then the published rate is presented to the subscribers/users as a value and/or a graphical image on their mobile device. In other examples, an indication of price is published to one or more wireless devices that is derived from existing bid values and/or existing bandwidth capacity values associated with capabilities of the core resource managers 128a-c.

Figure 2:
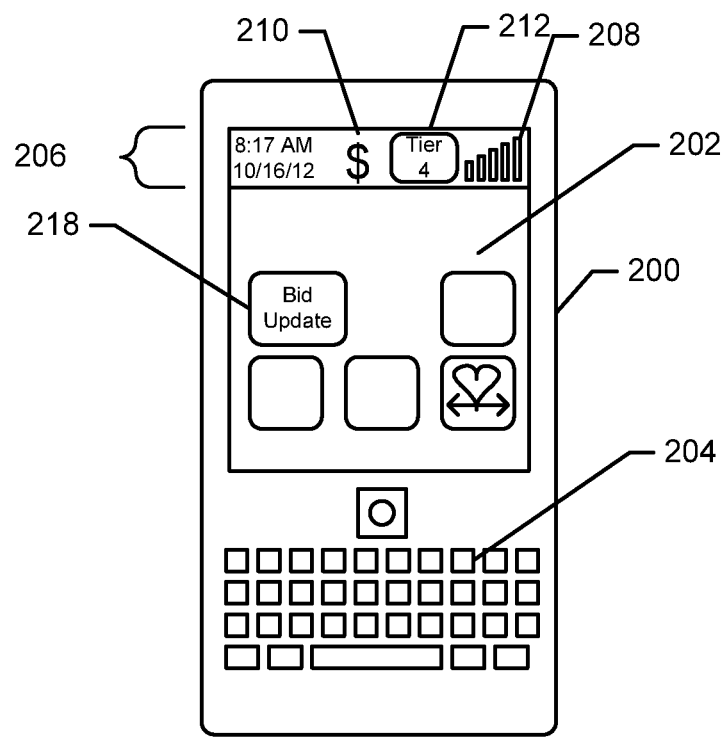
FIG. 2 is a schematic illustration of an example wireless device to receive ranked network priority services.
Figure 2:
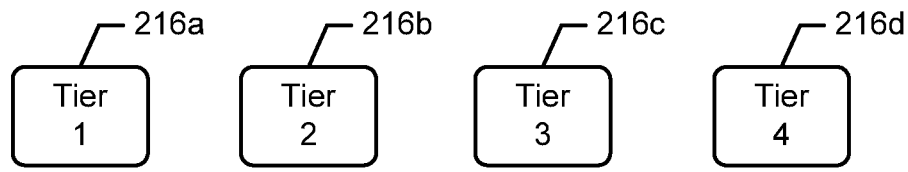

Briefly turning to FIG. 2, an example wireless device 200 is illustrated with a display 202, and a user interface area 204 (e.g., keypad, trackpad, menu button(s), touchscreen, etc.). While the illustrated example of FIG. 2 includes a separate display 202 and user interface area 204, example wireless devices may include any configuration and/or variation of display and user interface area, such as, for example, a user interface area that includes one or more virtual buttons, virtual keyboard buttons, etc., that may be touch activated as in an iPhone or other device. The example display 202 of FIG. 2 includes a status bar 206, which may inform a user of one or more status values such as, but not limited to time, date, temperature, WiFi signal availability, WiFi signal strength, and/or wireless provider signal strength 208. Additionally, the example status bar 206 of FIG. 2 includes a price indicator 210, and a bandwidth tier indicator 212.

In the illustrated example of FIG. 2, the price indicator 210 is a monetary value to represent a cost of joining and/or otherwise participating at a higher and/or lower tier of service. While the illustrated example of FIG. 2 includes a dollar sign ($), the price indicator 210 may include one or more cost values for corresponding tier services. As described above, the example core resource managers 128a-c measure activity values (e.g., levels) and, depending on whether the values exceed one or more thresholds, and/or depending on one or more current bids from other users, and/or depending on a base price to receive one or more services associated with a tier level, a corresponding price indicator 210 may be presented in the example status bar 206.

In the illustrated example of FIG. 2, the bandwidth tier indicator 212 informs a user of a type of bandwidth service enabled on the wireless device. For example, a first tier may represent a lowest level of priority for data communications for the user/subscriber, a fourth tier may represent a highest level of priority for data communications, and one or more gradients of intermediate tier levels may reside therebetween (e.g., tier 1.5, 2.0, 2.5, etc.). In some examples, the bandwidth tier indicator 212 may flash, change color and/or the wireless device may beep and/or vibrate when an opportunity to increase a tier plan in an effort to secure a higher data processing priority for the wireless device.

Alternate example bandwidth tier indicators 216a-d may correspond to indicator variations. In some examples, the user/subscriber may invoke a bid via a button press of the example wireless device 200, as described in further detail below. In the example of FIG. 2, example app indicator 218 corresponds to a bidding application that allows the user/subscriber to enter a bid value amount in an effort to increase a current tier status, decrease a current tier status and/or otherwise manage one or more bids. In the event that the entered bid amount is sufficient to raise a current tier status, the example bandwidth tier indicator 212 may change an appearance, such as from the alternate example indicator 216a to the example indicator(s) 216b-d. The bidding application of the illustrated example executes on the wireless device 200 and communicates with the example core resource manager(s) 128a-c via a cell tower.

In the illustrated example of FIG. 1, an example auction manager 130 is communicatively connected to the core network 113, which enables communicative access from the auction manager 130 to one or more core resource manager(s) 128a-c, to/from the network(s) 114, and/or to/from one or more wireless devices 122, 124a-c, 126a-f. In operation, the example auction manager 130 establishes new subscriber profiles and/or propagates subscriber profile information throughout the example wireless network environment 100. Profile information may include, but is not limited to, bidding preferences, geographic bidding preferences, payment information, etc. For example, a subscriber profile may indicate that an automatic bid of a predetermined amount may be presented in response to a tier status decrease (e.g., a tier status decrease from level 4 to level 3). Additionally, the example subscriber profile may indicate that, in the event of a tier level drop, automatic bids in a first predefined amount (e.g., $3.50) are authorized when in a first geographic location (e.g., Manhattan), and automatic bids in a second predefined amount (e.g., $1.50) are authorized when in a second geographic location (e.g., West Lafayette, Ind.). In still other examples, the example subscriber profile may indicate that an automatic bid of a predetermined amount may be implemented based on a time of day and/or a time of day for one or more geographic locations.

Figure 3:
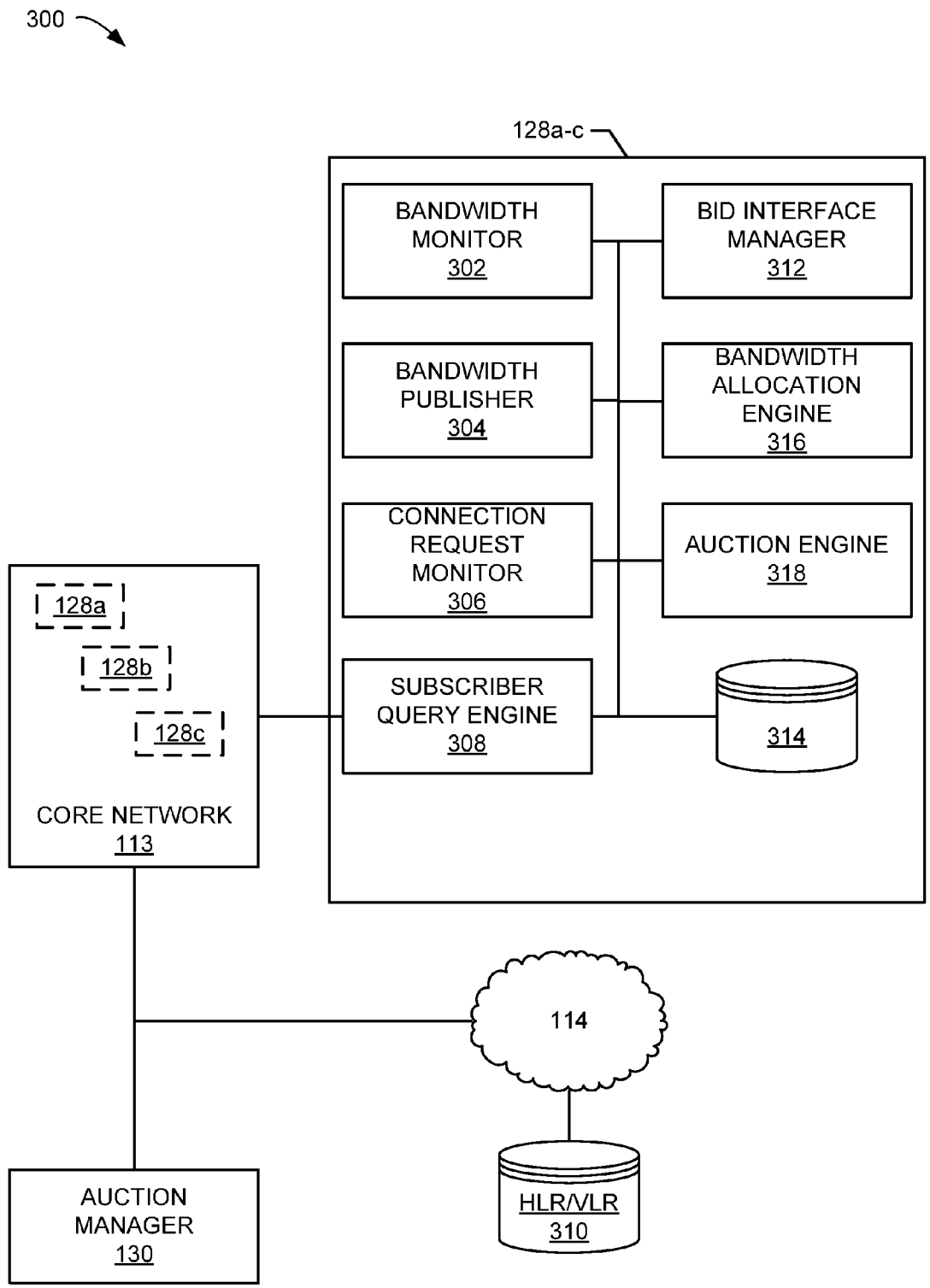
FIG. 3 is a schematic illustration of an example tower resource manager to facilitate ranked network priority services in connection with FIGS. 1 and 2.

FIG. 3 is a schematic illustration of an example implementation of any or all of the core resource manager(s) 128a-c of FIG. 1. In the illustrated example of FIG. 3, the core resource manager 128a-c includes a bandwidth monitor 302, a bandwidth publisher 304, a connection request monitor 306 and a subscriber query engine 308. The example subscriber query engine 308 may be communicatively connected to the core network 113, which may further enable communication with the example auction manager 130, a home location register (HLR) and/or a visitor location register (VLR) 310. Additionally, in the illustrated example of FIG. 3, the core resource manager 128a-c includes a bid interface manager 312, a local subscriber storage 314, a bandwidth allocation engine 316, and an auction engine 318. Some examples include means for monitoring bandwidth, means for publishing bandwidth information, means for monitoring connection request(s), means for managing subscriber queries, means for managing bids, means for allocating bandwidth, means for facilitating auction types, and/or means for managing auction preferences. In the illustrated example of FIG. 3, the means for monitoring bandwidth is the example bandwidth monitor 302, means for publishing bandwidth information is the example bandwidth publisher 304, means for monitoring connection request(s) is the example connection request monitor 306, means for managing subscriber queries is the example subscriber query engine 308, means for managing bids is the example bid interface manager 312, means for allocating bandwidth is the example bandwidth allocation engine 316, means for facilitating auction types is the example auction engine 318, and means for managing auction preferences is the example auction manager 130. Each of the means for monitoring bandwidth, means for publishing bandwidth information, means for monitoring connection request(s), means for managing subscriber queries, means for managing bids, means for allocating bandwidth, means for facilitating auction types, and/or means for managing auction preferences may be implemented by the processor P100 of FIG. 9 executing the instructions of FIGS. 5-8.

In operation, the example core resource manager 128a-c employs the example bandwidth monitor 302 to measure a bandwidth rate (e.g., Mb/second) of the corresponding tower interface, the corresponding core resource manager, and/or data communication cell area with which the core resource manager is associated. For example, the bandwidth monitor 302 of the core resource manager 128c measures the rate of incoming and/or outgoing data processed by a corresponding tower interface 108, 110, 112 to determine a degree of utilization. Depending on one or more bandwidth capabilities of the tower interface 108, 110, 112, one or more thresholds of bandwidth may be monitored to identify circumstances indicative of congestion. As used herein, congestion occurs when an amount of data processed by a tower interface and/or its associated core network elements (e.g., nodeBs, eNodeBs, radio network controllers (RNCs), SGSNs, SGWs, etc.) is near or at a maximum value of capability.

The example bandwidth publisher 304 of FIG. 3 publishes and/or otherwise communicates an indication of a degree of congestion, current tier level and/or price per tier opportunities to one or more wireless devices nearby. For example, the bandwidth publisher 304 of the first core resource manager 128a publishes an indication of the degree of congestion associated with the first tower 102 to the wireless device 122 in the first data communication cell area 116, the bandwidth publisher 304 of the second core resource manager 128b publishes an indication of the degree of congestion associated with the second tower 104 to the wireless devices 124a-c in the second data communication cell area 118, and the bandwidth publisher of the third tower resource manager 128c publishes the indication of the degree of congestion associated with the third tower 106 to the wireless devices 126a-f in the third data communication cell area 120. The indication of the degree of congestion may be published by the example bandwidth publisher 304 as a value illustrating a quantity of data per unit of time, an alphanumeric indicator(s), and/or a graphic. In some examples, one or more threshold data rates cause the bandwidth publisher 304 to generate a green icon (e.g., not congested), yellow icon (e.g., moderately congested) or red icon (e.g., substantially congested) based on whether one or more threshold(s) are exceeded or not exceeded. In other examples, the bandwidth publisher 304 includes a web server to publish the indication of the degree of congestion associated with the tower, thereby allowing one or more users to access information in a web-based manner.

The example connection request monitor 306 of the core resource managers 128a-c of FIG. 3 determines whether one or more wireless devices makes an attempt to connect to a tower. Requests to connect to the tower may include, but are not limited to, one or more users attempting to place a call via a wireless device, one or more users attempting to utilize data services with their wireless device, and/or one or more wireless devices registering with the tower (e.g., during device power-on, during cell tower device hand-off, etc.). If one or more wireless devices do not make an attempt to connect to a tower, the example core resource manager(s) 128a-c continue to measure data rates. In the event a connection attempt is made, the example subscriber query engine 308 determines whether the connection request is associated with a subscriber. For example, a subscriber may have a profile to indicate, in part, data connection privileges, preferred data connection rate(s) and/or default bidding instructions. One or more profiles may be stored in the example local subscriber storage 314, which may be communicatively connected to the example subscriber query engine 308. In some examples, the subscriber query engine 308 is communicatively connected to the network 114, and accesses an HLR/VLR 310 and/or the auction manager 130, which may contain one or more profiles. On the other hand, non-subscribers attempting to connect to the tower may be provided with an opportunity to provide one or more bids in an effort to receive data services having greater or lesser capabilities.

In the event the connection attempt is associated with a subscriber having a profile, the example bandwidth allocation engine 316 of FIG. 3 allocates bandwidth privileges per the profile parameter(s). The profile parameter(s) may indicate a preferred tier level of service with which the subscriber should be associated. On the other hand, in the event the connection attempt is associated with a subscriber without a profile, the example bid interface manager 312 provides the subscriber with one or more opportunities to select a preferred tier level of service. One or more preferred tier level of service selection(s) by the subscriber and/or identified by a profile may be processed by the example bandwidth allocation engine 316 to allocate a number of codes (e.g., HSDPA channelization codes) in a manner proportionate to a tier level of service associated with the user or subscriber. In other examples, the bandwidth allocation engine 316 controls one or more elements of the core network 113 to throttle and/or otherwise control a data rate associated with a wireless device associated with the subscriber or non-subscriber. For example, the bandwidth allocation engine 216 may cause and/or otherwise control the example RNC 152 (for UTRANs) or the example eNodeB 174 (for eUTRANs) to allow a certain bit rate through a corresponding network element (e.g., nodeB, RNC, etc.) to the wireless device.

In the event that a bid is received by the example auction engine 318 from a subscriber or a non-subscriber (e.g., a bid received to increase a tier level of service in a particular geographic location), the example auction engine 318 ranks each of the existing users of the tower. User and/or device ranking provides, in part, an indication of value each user places on receiving data services facilitated by the tower area capability. For example, higher ranked users spend more money in return for a tier level of service that provides a greater number of channelization codes and/or controlled bit rate(s) than lower ranked subscribers, thereby resulting in faster data service performance. On the other hand, lower ranked users spend less money and, as a result, are not entitled to the same tier level of service and/or corresponding data service performance abilities as higher paying users. As described in further detail below, in the event a bid entered by a user/subscriber is successful, then the user/subscriber's tier level of service increases and the example bandwidth allocation engine 316 allocates a corresponding increased number of channels and/or causes a data rate to increase via one or more elements of the core network 113. On the other hand, if the bid entered by a user/subscriber is too low to increase the current tier level of service (e.g., when compared to the existing and/or competing users of the tower), then the example bandwidth allocation engine 316 refrains from allocating additional channels to and/or increasing a data rate of that user/subscriber.

Figure 4:
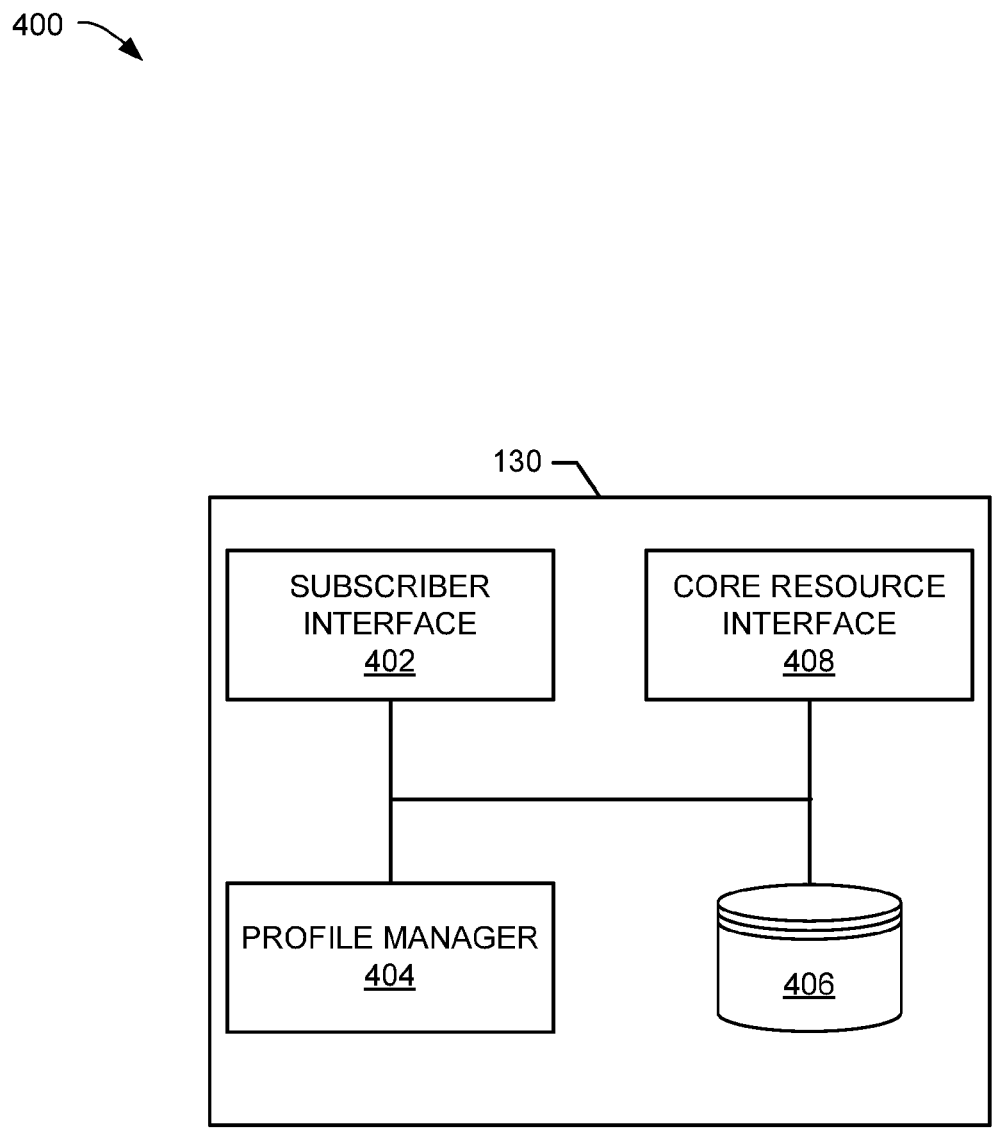
FIG. 4 is a schematic illustration of an example auction manager to facilitate ranked network priority services in connection with FIGS. 1-3.

FIG. 4 is a schematic illustration of an example implementation of the auction manager 130 of FIG. 1. In the illustrated example of FIG. 4, the auction manager 130 includes a subscriber interface 402, a profile manager 404, a profile store 406 and a core resource interface 408. Some examples include means for interfacing a subscriber, means for managing a subscriber profile and/or means for interfacing core resources. In the illustrated example of FIG. 4, the means for interfacing a subscriber is the example subscriber interface 402, the means for managing a subscriber profile is the example profile manager 404, and the means for interfacing core resources is the example core resource interface 408. Each of the means for interfacing a subscriber, means for managing a subscriber profile and/or means for interfacing core resources may be implemented by the processor P100 of FIG. 9 executing the instructions of FIGS. 5-8. In operation, the example subscriber interface 402 provides one or more user interfaces and/or graphical user interfaces (GUIs) for an existing subscriber and/or user(s) that do not yet have subscriber status. GUIs may be facilitated by, for example, a web server accessible by personal computers and/or wireless devices (e.g., wireless telephones). Wireless service subscribers associated with a particular wireless service provider may have a subscriber status for one or more services to facilitate ranked network priority by virtue of their service contract. On the other hand, users may establish an account and/or develop a profile so that ranked network priority services can be purchased, bid and/or otherwise used when the user is within communication range of a tower 102, 104, 106 and/or a corresponding tower interface 108, 110, 112. As a result, some or all users are free to jump from service provider to service provider based on winning/losing bids.

The example profile manager 404 of FIG. 4 includes one or more forms, templates and/or questions to be presented to a user that facilitate profile development. For example, the profile manager 404 of FIG. 4 presents the user with choices for incremental bid increase amounts (e.g., in a currency of interest, such as a dollar, a Euro, etc.) in the event an initial bid is unsuccessful due to congested conditions. In another example, the profile manager 404 of FIG. 4 presents the user with a bid price cap selection. In effect, if one or more repeated incremental bid increases continue, the profile may instruct the example core resource manager 128a-c to stop accepting bids when an upper bid threshold is reached. Details related to the one or more profiles developed by the example profile manager 404 may be stored in the example profile store 406. Additionally, the example core resource interface 408 of FIG. 4 propagates profile information to the example wireless network environment 100. For example, when a subscriber having a profile travels from one communication cell area to another communication cell area, the core resource interface 408 of the illustrated example transfers and/or otherwise provides profile information stored in the profile store 406 to an associated core resource manager 128a-c. In other examples, the core resource interface 408 provides subscriber profile information to one or more HLR and/or VLR elements of a wireless network, such as the example HLR/VLR 310.

While an example manner of implementing the example core resource manager(s) 128a-c and the example auction manager 130 have been illustrated in FIGS. 1-4, one or more of the elements, processes and/or devices illustrated in FIGS. 1-4 may be combined, divided, re-arranged, omitted, eliminated and/or implemented in any other way. Further, the example core resource manager(s) 128a-c, the example auction manager 130, the example bandwidth monitor 302, the example bandwidth publisher 304, the example connection request monitor 306, the example subscriber query engine 308, the example bid interface manager 312, the example local subscriber store 314, the example bandwidth allocation engine 316, the example auction engine 318, the example subscriber interface 402, the example profile manager 404, the example profile store 406 and/or the example core resource interface 408 of FIGS. 1-4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example auction manager 130, the example bandwidth monitor 302, the example bandwidth publisher 304, the example connection request monitor 306, the example subscriber query engine 308, the example bid interface manager 312, the example local subscriber store 314, the example bandwidth allocation engine 316, the example auction engine 318, the example subscriber interface 402, the example profile manager 404, the example profile store 406 and/or the example core resource interface 408 of FIGS. 1-4 are hereby expressly defined to include a tangible computer readable medium such as a memory, DVD, CD, etc. storing the software and/or firmware. Further still, the example wireless network environment 100 of FIG. 1 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the wireless network environment 100 of FIG. 1, any of the example core resource manager(s) 128a-c of FIGS. 1 and 3, and/or the example auction manager 130 of FIGS. 1 and 4 are shown in FIGS. 5-8. In these examples, the machine readable instructions comprise a program for execution by a processor such as the processor P105 shown in the example computer P100 discussed below in connection with FIG. 9. The program may be embodied in software stored on a tangible computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 5-8, many other methods of implementing the example wireless network environment 100 and/or the example core resource manager(s) 128a-c and/or the example auction manager 130 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 5:
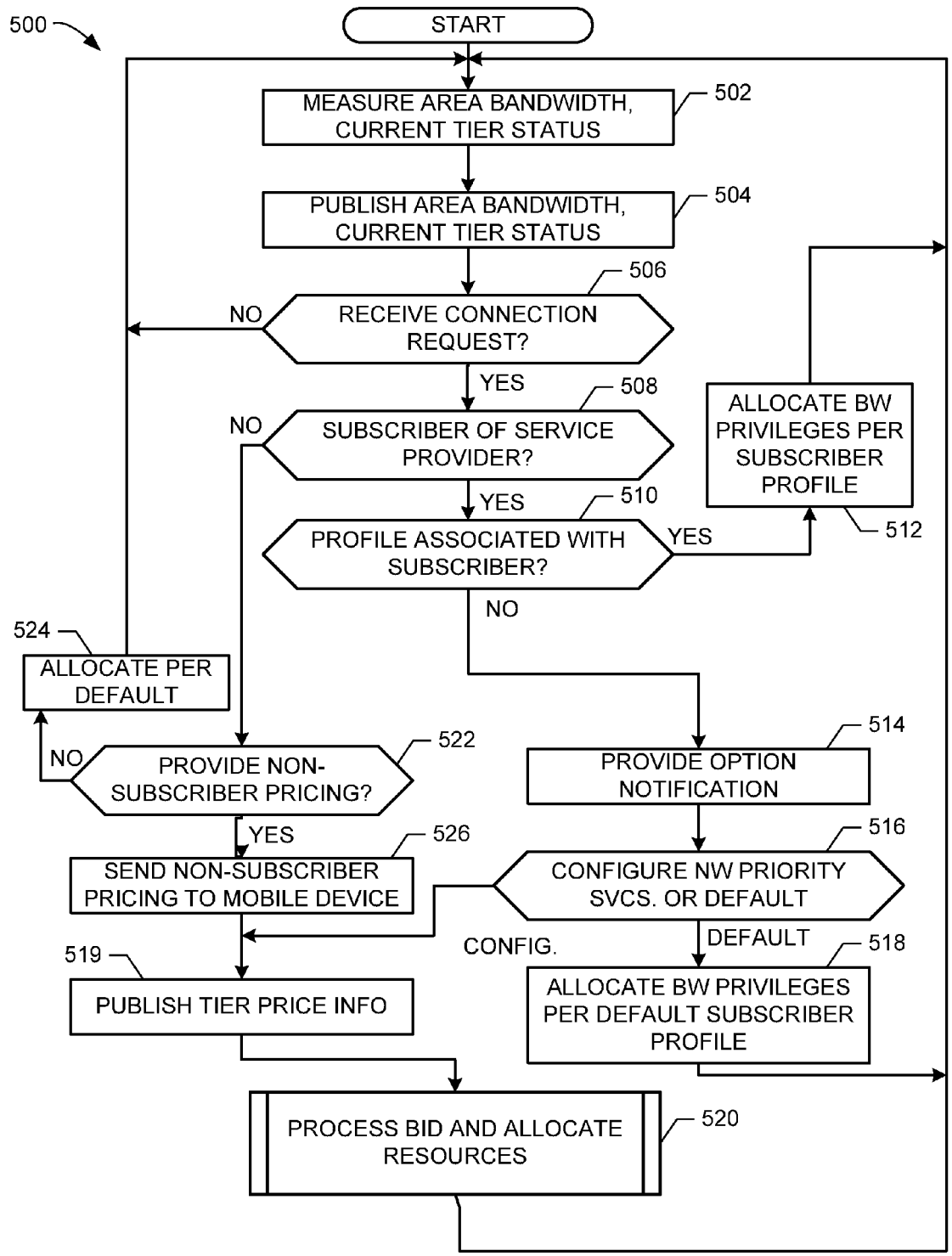
FIGS. 5-8 are flowcharts representative of example machine readable instructions that may be executed to implement the example network environment of FIG. 1, the example wireless device of FIG. 2, the example tower resource manager of FIG. 3 and/or the example auction manager of FIG. 4.

The program 500 of FIG. 5 begins at block 502 where the example bandwidth monitor 302 measures a bandwidth rate associated with a communication cell area, such as the example communication cell areas 116, 118, 120 of FIG. 1. As described above, a bandwidth rate may be measured to yield a value indicative of an amount of data transfer (e.g., through the cell tower) per unit of time, such as bits/second, kilobits/second (Kb/s), megabits/second (Mb/s), etc. To keep users/subscribers apprised of a current rate associated with the communication cell area with which they are associated, the example bandwidth publisher 304 publishes and/or otherwise makes available one or more values associated with the measured bandwidth, current tier status and/or current price per tier (block 504). The example bandwidth publisher 304 may transmit information indicative of the bandwidth rate to one or more wireless devices within the communication range of the data communication cell area and/or may employ a web server to make such information accessible via web-enabled devices. As described above, when the example bandwidth publisher 304 transmits, broadcasts and/or otherwise publishes information indicative of bandwidth to the one or more wireless devices, a corresponding price indicator 210 may appear on one or more wireless devices within the communication range of the area. One or more thresholds may be used to augment the price indicator 210 to illustrate a current cost associated with using corresponding tier services of a core resource manager 128a-c. In other examples, the example bandwidth monitor may provide one or more indications of bandwidth congestion. Degrees of congestion may be shown on the example status bar 206 such as, a red congestion indicator indicative of an amount of data traffic per unit of time that is at or near a maximum capacity for the tower and/or tower equipment (e.g., nodeB devices, RNCs, eNodeBs, etc.). In another example, a green congestion indicator may be shown in the status bar 206 that is generally indicative of an amount of data traffic per unit of time that is at or near a low-end threshold of capacity for which the tower can accommodate.

The example connection request monitor 306 detects and/or otherwise identifies a connection request from a wireless device (block 506). If no connection request occurs (block 506), then the example core resource manager 128a-c continues to measure a bandwidth, verify a current tier status and/or determine a congestion status on a periodic, aperiodic, scheduled and/or manual basis (block 502). On the other hand, in the event the example connection request monitor 306 detects and/or otherwise identifies a connection request from a wireless device (block 506), then the example subscriber query engine 308 identifies whether the connection request originates from a subscriber associated with the service provider that owns and/or otherwise manages the data communication cell area (block 508). At least one reason for determining whether the connection request is associated with a wireless subscriber includes one or more price breaks and/or data throughput access privileges afforded to wireless subscribers. In some examples, wireless subscribers enjoy a financial benefit when using similarly owned/operated wireless resources (e.g., cell towers, network resources, tower interfaces, etc.), while non-subscribers may require one or more additional fees to enjoy a similar bandwidth benefit.

In the event the request is associated with a wireless subscriber, then the example subscriber query engine 308 may search the example local subscriber store 314 for an indication of whether the subscriber has an associated priority profile (block 510). Additionally, the example subscriber query engine 308 may perform one or more queries via the network 114 to the profile store 406 of the example auction manager 130 and/or query one or more HLR/VLRs 310 of the network 100 to determine whether the subscriber has an associated priority profile. If so, then the example bandwidth allocation engine 316 allocates bandwidth privileges per one or more instructions and/or parameters of the subscriber profile (block 512). On the other hand, if the subscriber does not have an associated profile (block 510), then the example bid interface manager 312 provides a bandwidth selection option to facilitate default network priority services, or to configure specific network priority services (block 514).

In some examples, default network priority services are controlled by and/or otherwise dictated by a local policy associated with the example data communication cell area. For example, in rural areas the default network priority services attempt to provide a subscriber with scheduling options based on equality/access among all users. For instance, a round robin (RR) scheduling technique implemented by the example core resource manager 128a-c, a tower interface and/or a network element (e.g., nodeB, eNodeB, etc.) prioritizes all wireless devices equally. The RR scheduling emphasizes fairness (e.g., equal network accessibility) to all wireless devices over one or more considerations related to channel qualities. As such, even when one wireless device has particularly poor channel qualities due to, for example, residing near the edge of the data communication cell area, that wireless device will be given the same priority as another wireless device having superior channel qualities.

In other examples, a maximum throughput (MT) scheduling technique is employed as the default network priority. The example MT scheduling technique allocates resources in a manner that prioritizes throughput at the expense of fairness to all wireless devices. In the event a first wireless device has particularly poor channel characteristics due to, for example, residing near the edge of the data communication cell area, then resources for that first wireless device are reallocated to one or more other wireless devices capable of handling a greater amount of data throughput.

In still other examples, a proportional fair (PF) scheduling technique is employed as the default network priority. The example PF scheduling technique allocates resources based on a ratio of the instantaneous throughput of data for a wireless device, and a measured average of throughput for that wireless device. In other words, an average rate is computed over a time period as a moving average to provide a balance between maximizing system throughput and fairness.

Although the default network priority techniques described above include RR, MT and/or PF, such default scheduling techniques are not limited thereto. For example, one or more hybrid resource allocation techniques may be employed, such as implementing the MT scheduling technique until the tower reaches a threshold capacity, and then allocating resources in a different manner as a number of users and their associated wireless devices increase. In other examples, the core resource managers 128a-c reserve 25% of their available bandwidth on a first-come, first-served basis, and allocate 75% of their capable bandwidth in a manner that assigns network priority based on bid rank values. In still other examples, scheduling techniques may employ one or more of the aforementioned RR, MT and/or PF techniques in addition to bandwidth and/or data rate throttling. For instance, the tower interfaces 108, 110, 112, the core resource managers 128a-c and/or one or more elements of the core network 113 may constrain or permit varying data rates to one or more wireless devices. The degree of data rate constraint or permission may be based on bid value(s) received from the user of the wireless devices, operating characteristics of the wireless device, the scheduling model and/or any combination thereof.

In the illustrated example of FIG. 5, in the event a default network priority service is selected (block 516), the example bandwidth allocation engine 316 allocates resources based on one or more default scheduling technique(s) (block 518). On the other hand, in the event network priority services are selected (block 516), then the example core resource manager 128a-c publishes tier pricing information (block 519) and the auction engine 318 processes one or more bids and allocates resources based on the bids, wireless device operating characteristic(s) and/or scheduling model(s) operating within the corresponding communication cell area 116, 118, 120 (block 520), as described in further detail below.

In the event that the example subscriber query engine 308 identifies that the connection request originates from a user unaffiliated with the wireless service provider that owns and/or otherwise manages the core network 113, the corresponding core resource manager 128a-c and/or the corresponding tower interface 108, 110, 112 (block 508), then the example bid interface manager 312 of the core resource manager 128a-c determines whether users unaffiliated with the wireless service providers (foreign users) may be afforded an opportunity to participate in ranked network priority services (block 522). In some examples, a wireless service provider may distinguish their services based on the ability to offer their own subscribers the opportunity for faster and/or otherwise premium user experiences by way of the ranked network priority bidding process disclosed herein. In such examples, the wireless service provider may implement a policy within the communication cell area (e.g., 116, 118, 120) that prohibits foreign and/or free agent users from participating in one or more bids in an effort to obtain prioritized network services. In other examples, the wireless service provider may implement a policy that allows all users (both subscribers, foreign and/or free agent users) one or more opportunities to participate in one or more bids in an effort to obtain prioritized network services. In still other examples, the wireless service provider may implement a hybrid policy that allows all users such opportunities until a communication cell area bandwidth capacity threshold(s) is reached, after which only subscribers may continue to participate.

In the event the user is not allowed to participate (block 522), then the example bandwidth allocation engine 316 allocates bandwidth to the corresponding wireless device 200 based on one or more local policies associated with the communication cell area (block 524). On the other hand, in the event that the user is entitled to participate in ranked network priority services (block 522), then the example auction engine 318 sends and/or otherwise transmits information related to non-subscriber pricing to the requesting wireless device 200 (block 526). Additionally, tier price information may be published on-line and/or pushed to one or more wireless devices within the communication cell area (block 519). For example, while both subscribers and foreign users may be entitled to utilize ranked network priority services, foreign users may have a price structure different than that of subscribers. One or more bids received from the wireless device 200 are processed by the example auction engine 318 to determine a corresponding resource allocation (block 520), as described below.

Figure 6:
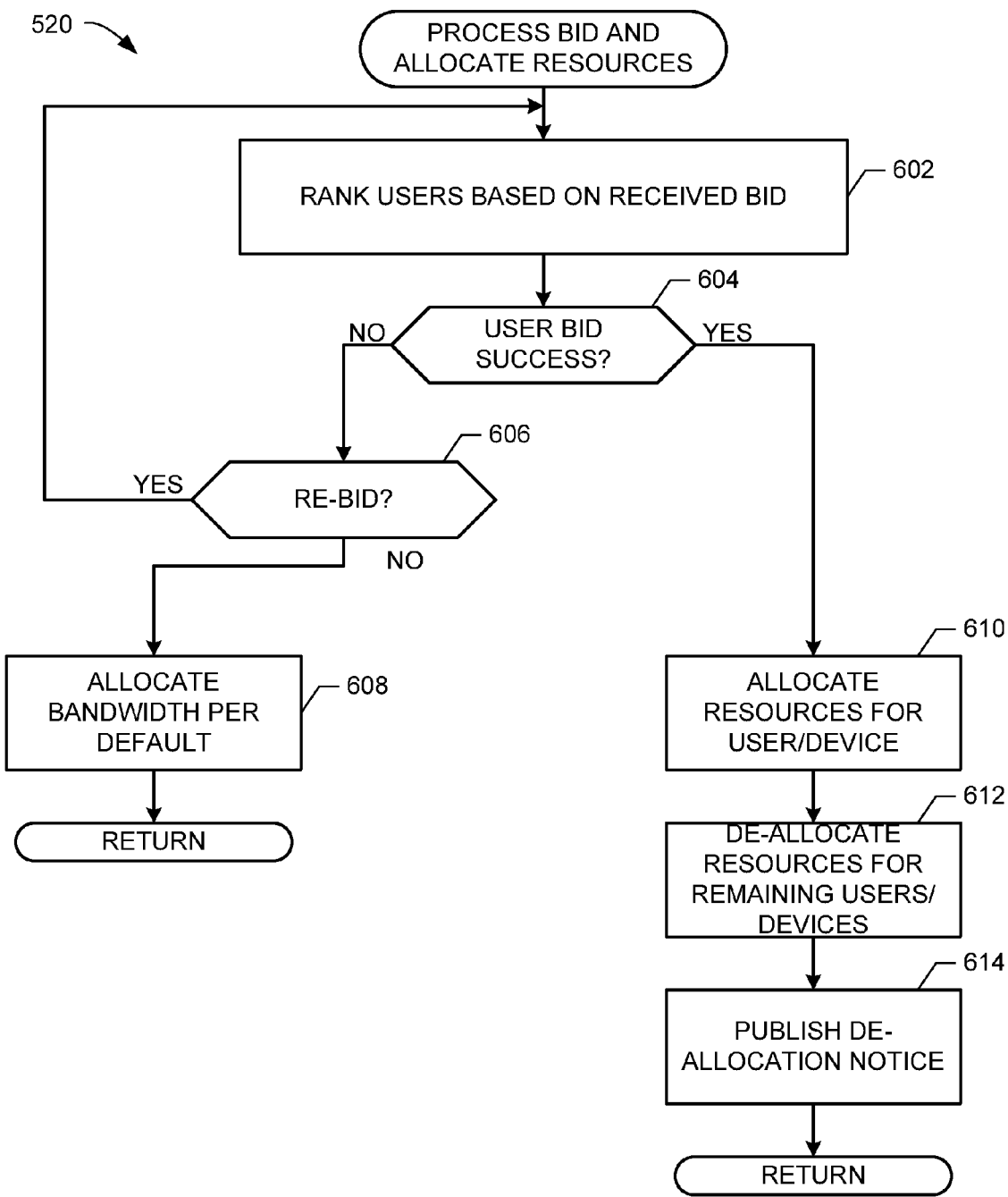

In the illustrated example of FIG. 6, the example auction engine 318 processes one or more bids and allocates resources (block 520). The example auction engine 318 ranks all users of the corresponding communication cell area (e.g., 116, 118, 120) based on their respective bids, and includes the bid received by the current bidder (e.g., a candidate user of ranked network priority services) (block 602). The example ranking may employ GSP-based modeling, in which N users compete for M<N communication channels available in a cell tower. The example GSP modeling allows each user (bidder) to bid an amount he/she is willing to pay for such communication channels. A wireless service provider and/or entity managing a cell tower may have a valuation $v_i$, and may receive bids $b_i$, in which i has a set membership of 1 through N users. An example ranking function g(i) may map users to channels. By employing GSP auctioning, the price charged depends on the price bid by the corresponding user or by the next best competitor for the allocated resources.

The example function g(i) seeks to rank the users based on a product of the bid $b_i$ and a policy specific measure $u_i$. The policy specific measure $u_i$ may be established by any type of search auction policy such as Rank-by-Bids (RBB) (e.g., a highest bid policy), or Rank-by-Revenue (RBR) (e.g., a highest profit policy). For example, a policy specific measure modeled after the RR policy ($u_i$,RR) may be set to a value of unity in an effort to promote a degree of fairness. In other examples, a policy specific measure modeled after the PF policy ($u_i$,PF) may be set to a value equal to the ratio of the user's instantaneous throughput of data and their average throughput. In still other examples, one or more congestion factors may be considered and/or otherwise calculated to promote and/or inflate prices that will result in a winning bid. For example, in the event a communication cell area is burdened with a relatively large number of wireless device data access request(s), and/or when a data rate and/or capacity of the cell tower exceeds a threshold, a corresponding premium price and/or base price for privileged services may be promoted via the one or more congestion factors. In effect, the example congestion factors may inflate the base price for services when one or more congestion metrics are relatively high. Such policies may be implemented in any wireless technology including, but not limited to, 2G, 3G, 4G, LTE, etc. Additionally, the one or more policies may be implemented in one or more portions of a wireless network, core network, radio access network, and/or combinations thereof.

Some example methods, apparatus, systems and/or articles of manufacture disclosed herein employ a proportional fair auction (PFauc) scheduling policy as a variant of PF that includes one or more bids from the users in its ranking. In particular, the example PFauc policy ranks users based on the product of bids to the ratio of the user's instantaneous throughput of data ($S_K$) and their average throughput ($\overline{S_K}$) in a manner consistent with example Equation 1.

$$b_k \frac{S_k}{\overline{S_k}}. \qquad \text{Equation 1}$$

Expected payment for allocation of a resource may be determined in a manner consistent with example Equation 2.

$$b_{g-1(g(k)+1)} \frac{\mu_{g-1}(g(k)+1), PFauc}{\mu_{k,PFauc}}. \qquad \text{Equation 2}$$

In operation, the example auction engine 318 allows each bidder to submit only one active bid and not separate bids for each instance of channel allocation from the core network 113 and/or components thereof. Further, processing a bid for each instance of channel allocation becomes impractical in view of, for example, a 2 mSec period with which nodeB devices perform allocation activities. In the illustrated example, entered bids represent a user's request for channel resources and/or data rate preferences. An actual calculated rank is based on the supplied bid and the bid(s) received by other (competing) users. Resources are allocated in a manner that favors a higher bid amount. On a periodic, aperiodic, scheduled and/or manual basis, a current and/or otherwise relatively recent bid amount value is published on a per-tier basis so that candidate bidders can appreciate a general value for service priority. A benefit of publishing per-tier price information is that candidate bidders do not need to enter numerous bids that are below a value that may result in receiving desired services. Such repeated bid entries may frustrate users, only to result in one or more bid failures without feedback as to a value that may result in success.

In the event a user's bid is unsuccessful at raising their corresponding bandwidth tier status (block 604), then the example bid interface manager 312 may prompt the user for a re-bid (block 606). If no re-bid is selected (block 606), the example bandwidth allocation engine 316 associates the user with a bandwidth tier status in a manner consistent with a default network priority service (block 608). As described above, default network priority services may include, but are not limited to round robin, maximum throughput, proportional fair, and/or any combination thereof. On the other hand, if a re-bid is selected (block 606), then the example process 520 returns to block 602.

In the event a user's bid is successful at raising their corresponding bandwidth tier status (block 604), then the example bandwidth allocation engine 316 allocates channelization resources for the user and/or throttles and/or otherwise adjusts a data rate associated with the user's wireless device via one or more elements of the core network 113 (block 610) (e.g., data rate control via the corresponding core resource manager 128a-c, data rate control via the nodeB, eNodeB, RNC, SGSN, GGSN, etc.). Users that previously operated with an elevated bandwidth tier status may be demoted to one or more lower bandwidth tier status levels in the event congestion in the tower is relatively high (and/or such users have been outbid). In the illustrated example, users that no longer have competitive bid value(s) are demoted to one or more lower tier status levels and resources allocated to their corresponding wireless devices are deallocated (block 612). In some examples, a winning bid entitles the corresponding wireless device to participate in the bandwidth tier status for a predetermined period of time, regardless of demand changes in the corresponding communication cell area. The example congestion publisher 304 of the illustrated example communicates one or more bandwidth tier status changes (e.g., up or down) via one or more messages (block 614).

Figure 7:
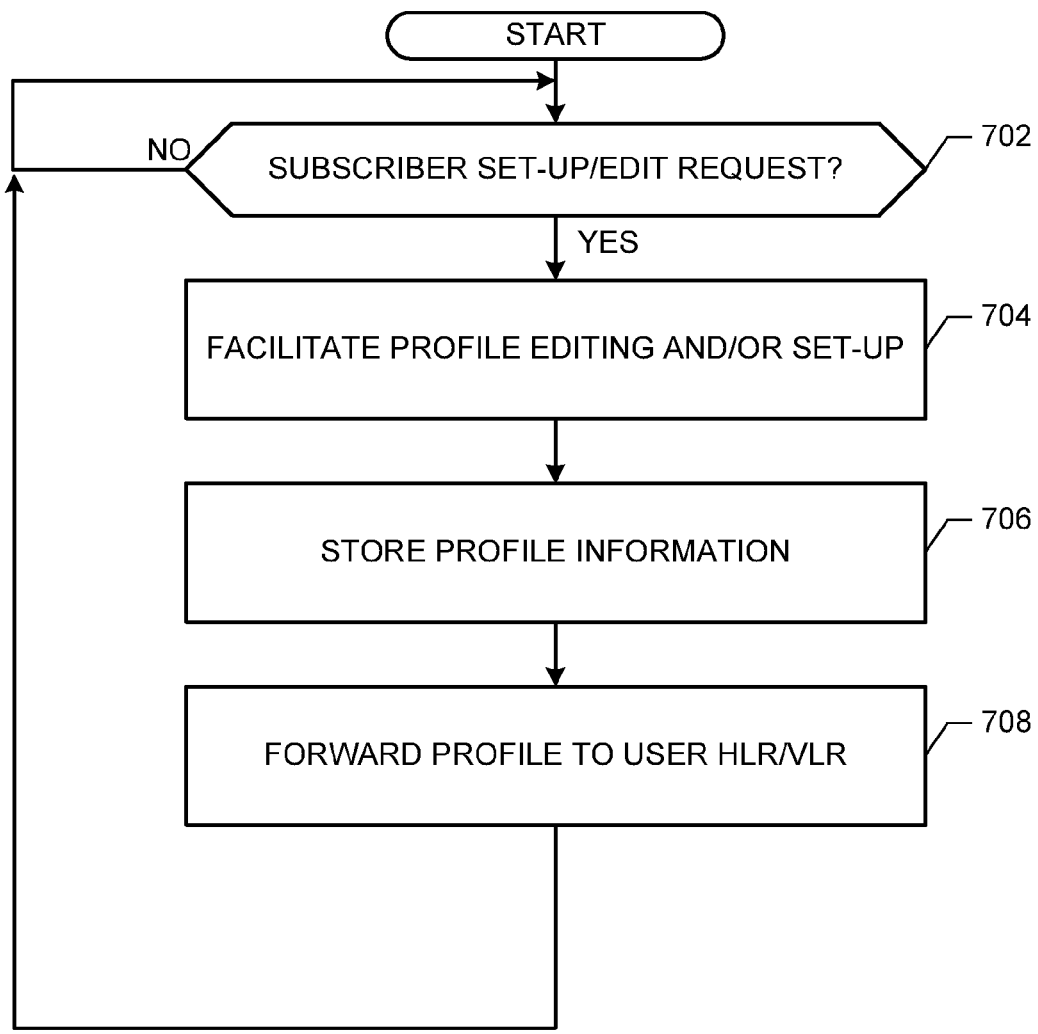

The program 700 of FIG. 7 illustrates example operation of the example auction manager 130 of FIG. 1. The program of FIG. 7 begins at block 702 where the subscriber interface 402 monitors for a subscriber set-up and/or edit request. In the event no request to set-up a profile and/or edit a profile occurs (block 702), then the example program 700 continues to monitor for such event(s). On the other hand, if a request to set-up and/or edit a profile occurs (block 702), then the example profile manager 404 facilitates profile editing and/or set-up (block 704). As described above, the example profile manager 404 may include a web server to generate one or more forms to present to a candidate and/or current subscriber. Forms may include, but are not limited to one or more questions, drop-down selections and/or fields to tailor bidding preferences, tailor default network priority tier level preferences and/or tailor default preferences when visiting networks and/or towers outside the control of a user's wireless service provider. For example, a profile may be configured via the example profile manager 404 to maintain the user's wireless device at a top tier (e.g., highest performing, most responsive, fastest data throughput) when in or around the vicinity of New York city, but to maintain the user's wireless device at a default tier in any other geographic location.

Edited and/or generated profiles may be stored by the example profile manager 404 in the example profile store 406 (block 706). In some examples, and as described above, the example subscriber query engine may access profile information associated with one or more subscribers via the example network 114, the auction manager 130 and/or the HLR/VLR 310. In other examples, the core resource interface 408 may forward profile information to one or more core resource managers 128a-c and/or one or more HLR/VLRs 310 within the example network 100 (block 708).

Figure 8:
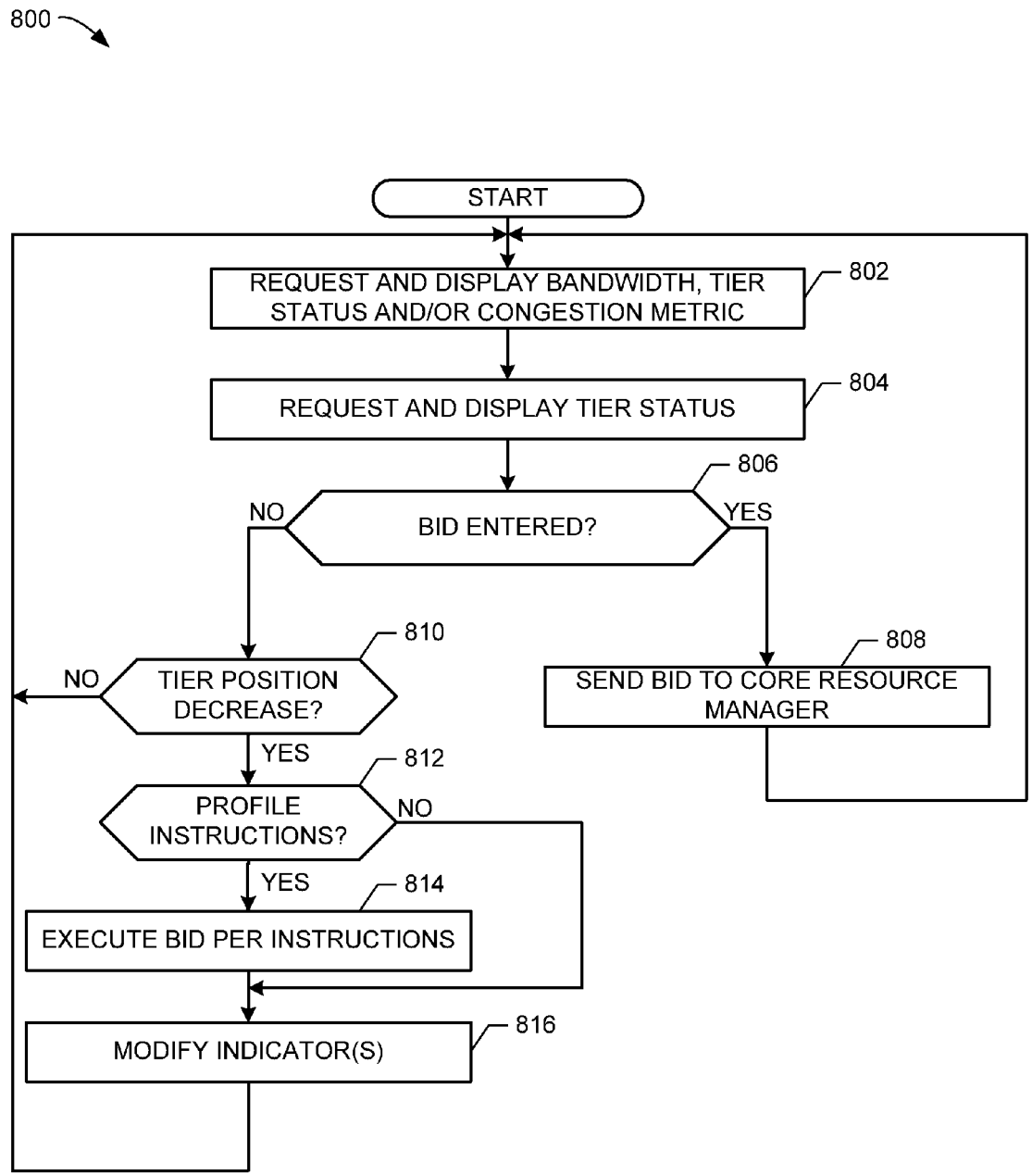

The program 800 of FIG. 8 illustrates example operation of the example wireless device 200 of FIG. 2. The program of FIG. 8 begins at block 802 where the wireless device 200 requests a metric associated with the user's current tier status, bandwidth limit(s), data rate and/or a congestion metric associated with the communication area. Requests for such metrics may be prompted periodically, aperiodically, on a scheduled basis and/or manually by an application installed and executing on the example wireless device 200. As described above, the example metric(s) may be shown on the wireless device 200 as an icon, a graphic, alphanumeric text and/or any combination thereof. In some examples, a congestion indicator may appear as a pie chart that fills up when one or more threshold capacity limits of a cell tower are reached. In other examples, the wireless device 200 may display a price indicator, such as the example price indicator 210 of FIG. 2. The example wireless device 200 may also request and display a bandwidth tier status, such as the example bandwidth tier indicator 212 and/or 216a-d of FIG. 2 (block 804).

In the event a bid is entered via the example wireless device 200 (block 806), then the bid value is sent to the example core resource manager 128a-c associated with a data communication area that is within a communication range of the wireless device 200 (block 808). On the other hand, if a bid is not entered, then the example wireless device 200 and/or the bid update app 218 determines whether a tier status associated with the wireless device 200 has decreased (block 810). If not, then the example program 800 returns control to block 802 to determine a current congestion metric on a periodic, aperiodic, scheduled and/or manual basis. If the tier status associated with the wireless device 200 has decreased (block 810), then the wireless device 200 and/or the bid update app 218 determines whether the wireless device 200 includes associated profile instructions (block 812). If so, then one or more bid instructions may be performed in a manner consistent with the profile designed and/or otherwise developed by the user associated with the example wireless device 200 (block 814).

Profile instructions may be stored in a memory of the wireless device 200 and/or may be wirelessly retrieved by accessing the subscriber query engine 308 and/or the local subscriber store 314 of the core resource manager 128a-c, and/or may be wirelessly retrieved by accessing one or more HLR/VLRs 310 of the network 100. In the event there are no profile instructions that correspond to the wireless device 200 and/or the user of the wireless device 200, then the example wireless device 200 modifies one or more indicators, such as the example bandwidth tier indicator 212, 214a-e and/or a price indicator 210 associated with a price to receive different bandwidth tier services (block 816). Modification of the bandwidth tier indicator(s) 212, 214a-e may include, but is not limited to flashing, one or more animations and/or audio/vibration cues.

Figure 9:
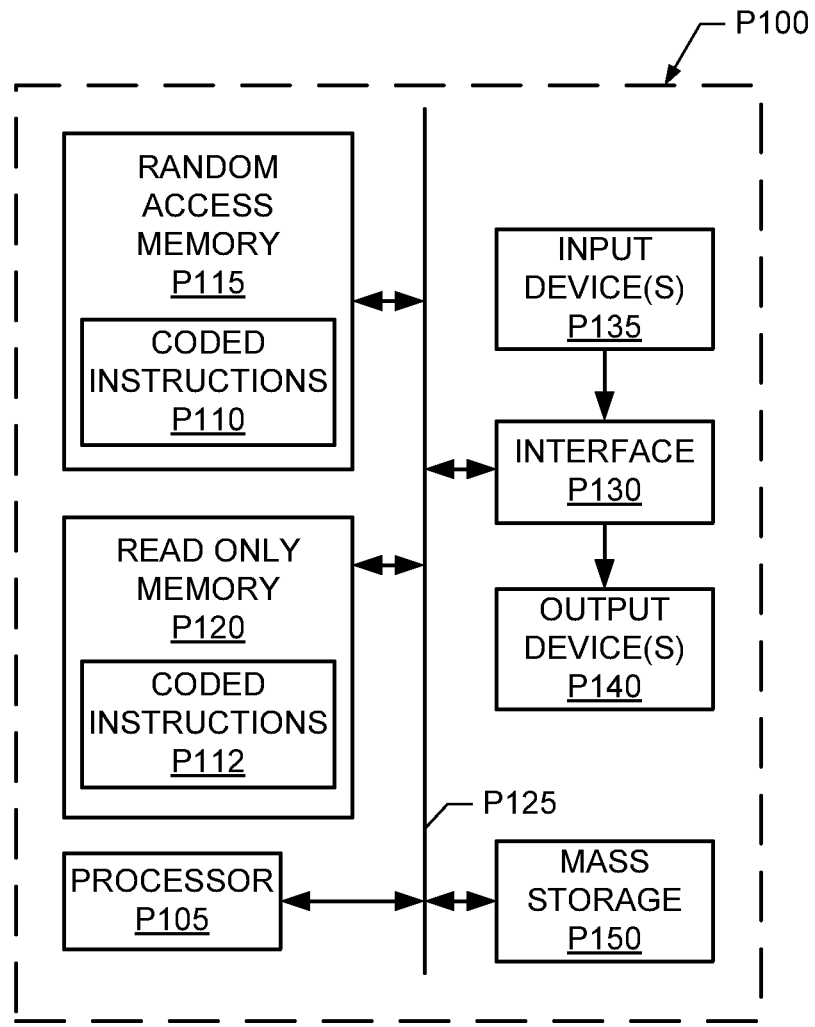
FIG. 9 illustrates an example processor platform that may execute the instructions of FIGS. 5-8 to implement any or all of the example methods, systems, and/or apparatus disclosed herein.

FIG. 9 is a block diagram of an example processing platform P100 capable of executing the instructions of FIGS. 5-8 to implement the example network 100, the example core resource manager 128a-c and the example auction manager 130 of FIGS. 1-4. The processor platform P100 can be, for example, a server, a personal computer, a tablet, a mobile phone, or any other type of computing device.

The processor platform P100 of the instant example includes a processor P105. For example, the processor P105 can be implemented by one or more Intel® microprocessors. Of course, other processors from other families are also appropriate.

The processor P105 is in communication with a main memory including a volatile memory P115 and a non-volatile memory P120 via a bus P125. The volatile memory P115 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory P120 may be implemented by flash memory and/or any other desired type of memory device. Access to the main memory P115, P120 is typically controlled by a memory controller.

The processor platform P100 also includes an interface circuit P130. The interface circuit P130 may be implemented by any type of past, present or future interface standard, such as an Ethernet interface, a universal serial bus (USB), and/or a PCI express interface.

One or more input devices P135 are connected to the interface circuit P130. The input device(s) P135 permit a user to enter data and commands into the processor P105. The input device(s) can be implemented by, for example, a keyboard, a mouse, a touchscreen, a track-pad, a trackball, isopoint and/or a voice recognition system.

One or more output devices P140 are also connected to the interface circuit P130. The output devices P140 can be implemented, for example, by display devices (e.g., a liquid crystal display, and/or a cathode ray tube display (CRT)). The interface circuit P130, thus, typically includes a graphics driver card.

The interface circuit P130 also includes a communication device, such as a modem or network interface card to facilitate exchange of data with external computers via a network (e.g., an Ethernet connection, a digital subscriber line (DSL), a telephone line, coaxial cable, a cellular telephone system, etc.).

The processor platform P100 also includes one or more mass storage devices P150 for storing software and data. Examples of such mass storage devices P150 include floppy disk drives, hard drive disks, compact disk drives and digital versatile disk (DVD) drives.

The coded instructions of FIGS. 5-8 may be stored in the mass storage device P150, in the volatile memory P110, in the non-volatile memory P112, and/or on a removable storage medium such as a CD or DVD.

From the foregoing, it will be appreciated that disclosed example methods, apparatus, systems and/or articles of manufacture allow wireless devices to bid to participate in one or more levels of network access. In the event that a particular geographic area (e.g., a cell tower) includes a relatively high number of wireless devices, example methods, apparatus, systems and/or articles of manufacture disclosed herein may provide a degree of relief to the corresponding area of the network by allocating channel resources that correspond to user valuation.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to allocate resources of a wireless network, comprising:
   calculating a rank of a first wireless device relative to a plurality of wireless devices based on a first bid value associated with the first wireless device;
   allocating a first bit rate to the first wireless device based on the rank of the first wireless device at a first time; and
   in response to detecting a change in availability of the first bit rate at a second time, applying a second bid value for a second bit rate when the first wireless device is located in a first geographic area, and applying a third bid value for the second bit rate when the first wireless device is located in a second geographic area different from the first geographic area.

2. A method as defined in claim 1, further comprising establishing a base price for the first bit rate when a threshold associated with a wireless core network is satisfied.

3. A method as defined in claim 1, wherein allocating the first bit rate comprises allocating a quantity of channelization codes to the first wireless device based on the rank.

4. A method as defined in claim 1, further comprising obtaining the first bid value from a profile associated with the first wireless device.

5. A method as defined in claim 4, wherein the profile comprises an automatic bid instruction.

6. A method as defined in claim 5, wherein the automatic bid instruction is selected based on a first geographic area of the first wireless device.

7. A method as defined in claim 4, wherein the profile comprises an automatic bid instruction corresponding to a first time of day.

8. A method as defined in claim 7, wherein the automatic bid instruction specifies the first bid value for the first time of day, and the second bid value for the second time.

9. A method as defined in claim 1, further comprising calculating a price of the first bit rate.

10. A method as defined in claim 9, wherein calculating the price for the first bit rate is based on at least one of the first bid value, a bid value of a next highest bidder, or an operating characteristic of the first wireless device.

11. An apparatus to allocate resources of a wireless network, comprising:
    a bid interface manager to obtain a first bid value associated with a first wireless device;
    an auction engine to identify a rank of the first wireless device with a plurality of wireless devices based on the first bid value associated with the first wireless device; and
    a bandwidth allocation engine to:
       allocate a first bit rate to the first wireless device based on the rank of the first wireless device at a first time; and
       in response to detecting a change in availability of the first bit rate at a second time:
          apply a second bid value for a second bit rate when the first wireless device is located in a first geographic area; and
          apply a third bid value for the second bit rate when the first wireless device is located in a second geographic area different from the first geographic area.

12. An apparatus as defined in claim 11, wherein the bandwidth allocation engine is to control the first bit rate associated with the first wireless device via at least one of a nodeB, a radio network controller, an eNodeB, or a general packet radio service support node.

13. An apparatus as defined in claim 11, further comprising a bandwidth monitor to measure at least one of a data capacity, a data rate, an average data rate, or a channel quality associated with a wireless network.

14. An apparatus as defined in claim 11, wherein the auction engine is to establish a base price for the first bit rate or the second bit rate when a threshold associated with a wireless core network is satisfied.

15. A tangible machine readable storage device comprising instructions that, when executed, cause a machine to perform operations comprising:
 calculating a rank of a first wireless device relative to a plurality of wireless devices based on a first bid value associated with a first wireless device;
 allocating a first bit rate to the first wireless device based on the rank of the first wireless at a first time; and
 in response to detecting a change in availability of the first bit rate at a second time, applying a second bid value for a second bit rate when the first wireless device is located in a first geographic area, and applying a third bid value for the second bit rate when the first wireless device is located in a second geographic area different from the first geographic area.

16. A tangible machine readable storage device as defined in claim 15 having instructions stored thereon that, when executed, cause the machine to measure at least one of a data capacity, a data rate, an average data rate, or channel quality associated with the wireless network.

17. A tangible machine readable storage device as defined in claim 15 having instructions stored thereon that, when executed, cause the machine to control the first bit rate associated with the first wireless device via at least one of a nodeB, an eNodeB, a radio network controller, or a general packet radio service support node.

18. A tangible machine readable storage device as defined in claim 15 having instructions stored thereon that, when executed, cause the machine to obtain the bid value from a user associated with the first wireless device.

19. A tangible machine readable storage device as defined in claim 15 having instructions stored thereon that, when executed, cause the machine to apply a scheduling model based on a round-robin throughput priority policy to allocate the resources proportionately between the first wireless device and a second wireless device.

20. A tangible machine readable storage device as defined in claim 15 having instructions stored thereon that, when executed, cause the machine to apply a scheduling model based on a proportional fair throughput priority policy to allocate the resources based on a ratio of a data rate and an average data rate of the first wireless device.

* * * * *